June 28, 1966  T. D. SHARPLES  3,257,869
PLANETARY GEARING
Filed Sept. 20, 1963  2 Sheets-Sheet 1

INVENTOR.
THOMAS D. SHARPLES
BY *Wallace Hooper*
ATTORNEY

June 28, 1966    T. D. SHARPLES    3,257,869
PLANETARY GEARING

Filed Sept. 20, 1963    2 Sheets-Sheet 2

INVENTOR.
THOMAS D. SHARPLES
BY Dalbert Hooper
ATTORNEY

United States Patent Office 3,257,869
Patented June 28, 1966

3,257,869
PLANETARY GEARING
Thomas D. Sharples, Lansdale, Pa., assignor to Pennsalt
Chemicals Corporation, a corporation of Pennsylvania
Filed Sept. 20, 1963, Ser. No. 310,206
8 Claims. (Cl. 74—801)

This invention relates to planetary gear systems. More specifically this invention relates to a planetary gear system having means to lengthen the life of the system by implementing distribution of the load among the elements thereof.

In planetary gearing systems there are several conditions which may give rise to ultimate failure of the gears. One such condition may be slight imprecisions in the shape of the gear teeth which give rise to dynamic loading often responsible for tooth failure. This condition may obviously be corrected by the use of gears of greater precision. Another condition which may lead to ultimate failure of the system is uneven sharing of the load between the planets. Even if the gears are precisely made it is inevitable that the load will not be shared equally by all of the planets since there are bound to be some minor errors in their angular positioning in their carrier. In poor load sharing at full load in a three-planet system, the distribution may be 60%, 30%, 10%, while at minimum load one planet may be transmitting the entire load.

Attempts to avoid or minimize uneven sharing of the load between the planets have involved more accurate location for the planets on their carrier. However, unless the carrier is extremely massive and rigid to maintain this accuracy, precise positioning will be to no avail. As torque is transmitted by a light carrier the shafts of the planet gears are canted with respect to the axis of the system so that uneven loading and poor tooth contact result.

To avoid the necessity of precise positioning of the planets on their carrier, some prior structures have permitted a limited annular movement to individual planetaries whereby upon the occurrence of increased load the planets may shift relatively in their torque-transmitting carriers to avoid continuous unequal sharing and thereby compensate for imprecise placement. However, of the prior art attempts the benefits have been at least partially vitiated by either a canting of the axes of the planets as they shift annularly or by a massive and expensive carrier structure designed to preclude planet gear canting.

The problem of providing torque-transmitting carrier structure to permit annular shifting and at the same time avoid canting is compounded in gear boxes of the rotating high-speed type. In some applications, such as in the conventional worm centrifuge, as illustrated in U.S. Patent 3,061,181 which issued October 30, 1962, gear boxes are subjected to speeds in the neighborhood of 8000 r.p.m., for instance, and the planet carriers within the gear boxes may reach a speed of, for instance, 7500 r.p.m. At such speed centrifugal force acts on the planetary gears throwing them outward with a force that practicable carriers of the prior art cannot endure.

It is an object of my invention, therefore, to provide in a planetary gear system resilient mounting of the planetary gears in an annular direction so that they may shift position to avoid continuous unequal sharing of the transmitted load.

Another object of the invention is to provide relatively rigid radial support of the planetary gears against centrifugal force.

A further object of my invention is to provide for the individual planets freedom to assume the optimum tooth contact position with the sun and ring gears.

A still further object of the invention is to provide in a planetary system resilient filtering of transient strains (dynamic loading) of individual gear teeth.

Other objects of the invention will be apparent from the following specification including the drawings in which a preferred embodiment of the invention is described and shown.

Briefly, I have developed, especially for a high speed system, a planetary gear arrangement including a light-weight rigid carrier which holds the planets against being thrown out under centrifugal force and at the same time permits annular adjustment with freedom for optimum tooth contact. Independent of the carrier I provide a light-weight resilient torque transmission element engaging each of the planets.

Figure 1:
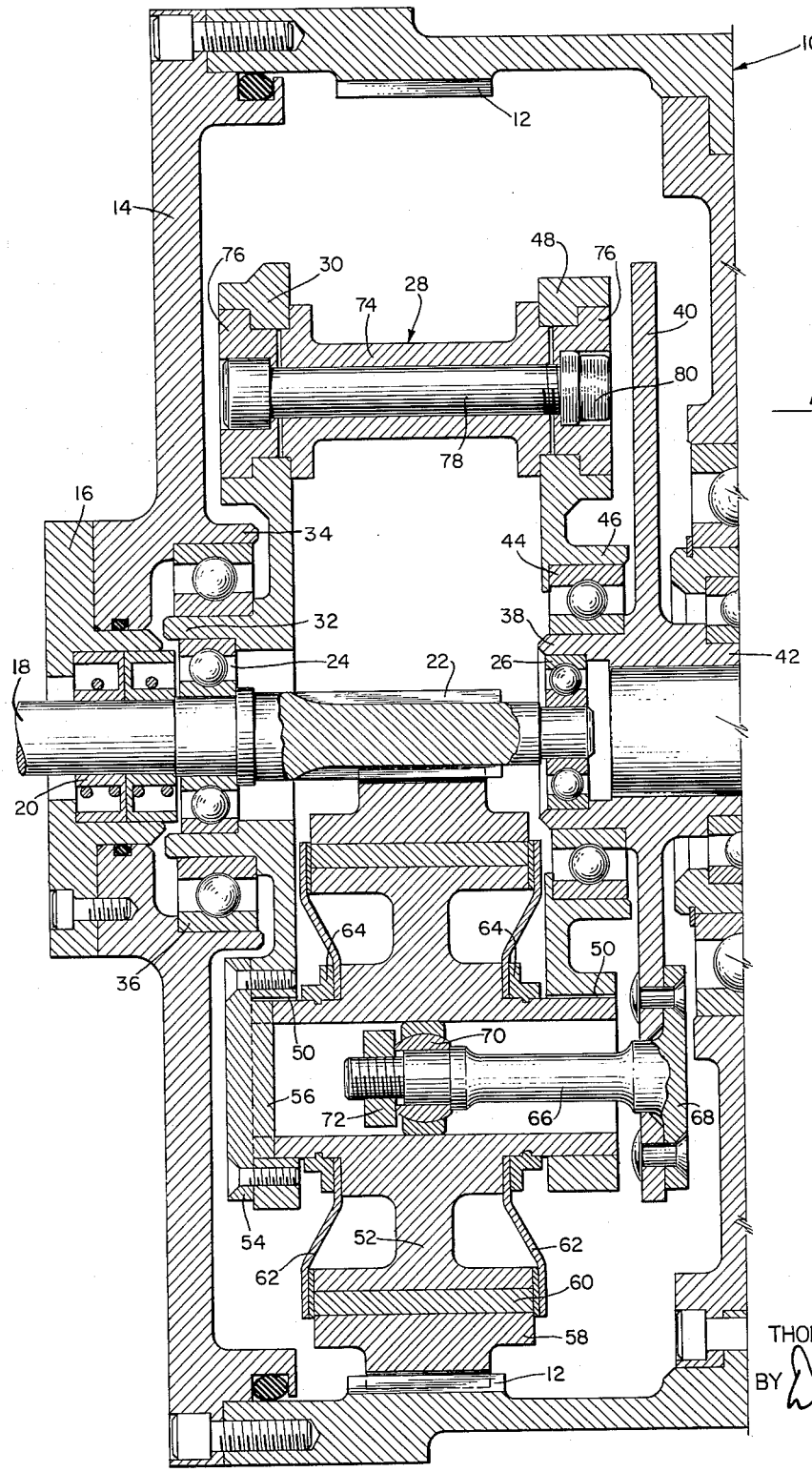
FIGURE 1 represents a sectional view taken on the line 1—1 of FIGURE 2 and shows a portion of a gear box embodying the invention.
Figure 2:
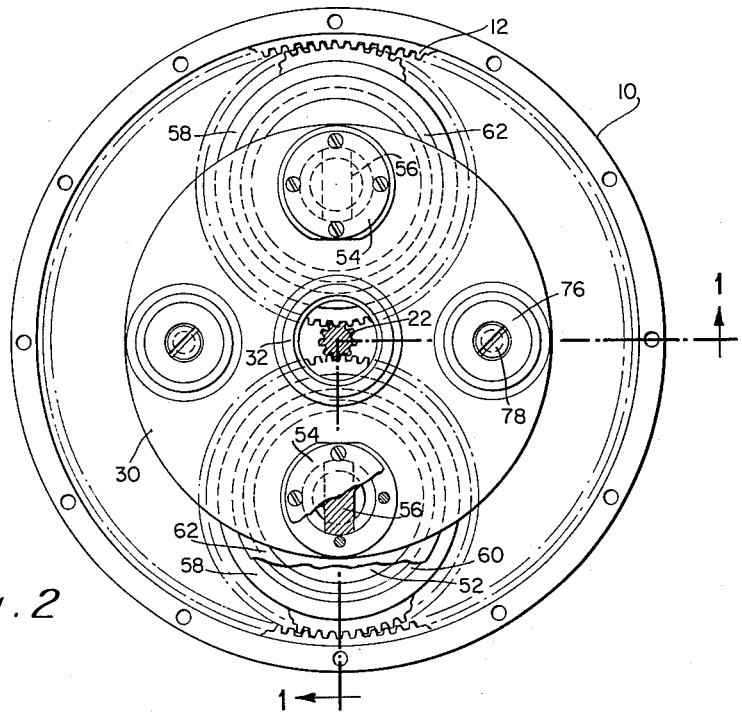
FIGURE 2 represents a reduced end view of an apparatus embodying the invention with the cover and end bearings removed.

Referring more specifically to the drawings, an apparatus embodying the invention is shown in section in FIGURE 1. It comprises a gear box including a cylindrical housing 10 (shown in part) presenting an internal ring gear 12 and having an end cover 14 bolted thereto. Over a central opening in the end element is secured a cover plate 16 which is also centrally apertured and reives a driving shaft 18. Appropriate seals 20 are mounted in the cover plate and snugly engage the shaft to hold lubricating oils inside the box.

As shown the driving shaft 18 presents a sun gear 22, on either side of which are positioned respectively the carrier bearing 24 and a torque plate bearing 26. A carrier assembly 28, which serves as a restraining means restraining the planet gears against substantial outward movement under centrifugal force, comprises a front carrier plate 30 having an annular flange 32 engaged about the bearing 24. An inwardly extending annular flange 34 is disposed on the end cover 14 and a stabilizing bearing 36 is disposed between the flanges 32 and 34 to hold the carrier plate 30 in position, permitting it to rotate.

Engaging about the bearing 26 is a central hub 38 on the torque plate 40. A rightward extension 42 of the torque plate transmits the rotational movement of the plate and may extend to another stage of planetary (not shown).

The hub 38 has engaged about it a bearing 44 which in turn is surrounded by a flange 46 on the rear carrier plate 48 which is another part of the carrier assembly 28.

The carrier plates 30 and 48 are formed with aligned ample openings 50 for each planet gear. As shown, the ends respectively of the hollow hub of the planetary journal 52 are disposed in the openings. To the plate 30 over the opening 50 is secured a cap 54. The inside of the cap 54 is formed with a key 56 which is received in suitable slots in the end of the journal 52 to keep the journal from turning.

As shown the gear rim 58 is provided internally with a bronze bushing 60 which rotates relative to the journal. The gear rim 58 and journal 52 are held from lateral displacement with respect to each other by a pair of clamp rings 62 held in position against shoulders on the journal hub by lock rings 64. As shown, the planet gear comprising rim 58 meshes with both the ring gear 12 on the gear box and the sun gear 22.

The torque plate 40 is apertured in alignment with the hollow center of each of the journals 52. Through each of the apertures extends a torque arm 66 having a base 68 which preferably is firmly attached to the torque plate 40 as shown. The distal end of the torque arm 66 is reduced and connected to the journal 52 by a spherical bearing unit 70 held in position by a nut 72 engaging the threaded end of the arm. The spherical bearing 70 is received into the central opening in the journal in a sliding fit and permits pivotal or swivel movement between the torque arm and the journal.

Also comprising the carrier assembly 28 in the embodiment shown are a pair of spacers 74 (FIG. 1), the ends of which are received respectively into openings in the carrier plates. Suitable buttons 76 are provided and a machine screw 78 with nut 80 holds the unit together.

As stated and shown (FIG. 1) the openings 50 in the carrier plates are ample, permitting considerable freedom of movement between the journal 52 and the carrier assembly. For instance, the openings in the carrier plates may be .010″ oversize. This will permit not only annular movement of the journal with respect to the carrier but also some radial movement which is not particularly desirable but may usually be tolerated. Spur gears usually used as planets may be run slightly displaced from the true pitch line. As an alternative the openings 50 may be arcuate, their margins representing arcs from the axis of the structure. In this fashion annular movement of the journal is permitted with substantially no radial movement.

Figure 3:
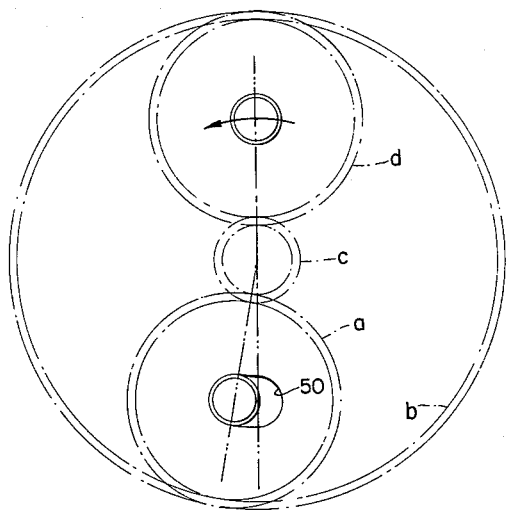
FIGURE 3 is a schematic view showing the action of an apparatus embodying the invention.

In operation, with the gear box rotating, the structure shown permits adjustment of the planet gears when uneven load sharing occurs. As illustrated schematically and in exaggerated fashion in FIGURE 3, should the planetary gear $a$ in meshing with ring gear $b$ and sun gear $c$ incur an unusual load the torque arm 64 and plate 40 will absorb part of the shock and will permit gear $a$ to lag behind the carrier. This causes a greater portion of the load to be distributed through the other torque arm to the other planet gear $d$. The opening 50 in the carrier is schematically illustrated in FIGURE 3 as arcuate to indicate the permitted annular adjustment, and the virtual absence of outward movement.

Thus it may be seen by virtue of the structure shown that continuous uneven load sharing is avoided as the load is distributed to all planetaries in the system. At the same time the flexible connection between the torque elements and the planets and the independent carriers preclude the possibility of the planets canting with respect to the axis of the ring and sun gears. The lightweight character of the arrangement makes it ideal for high speed uses, for inertial problems are minimized.

Aside from resilience being provided in the torque arm 66, the torque plate 40, to which the torque arms are attached, may be resilient as well. For instance, special machining of the torque plate to provide oriented flexibility is possible.

Figure 4:
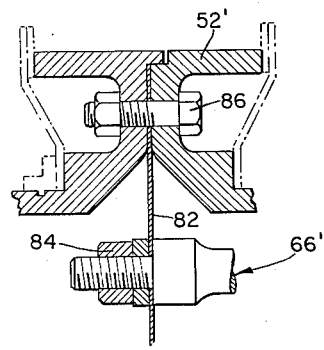
FIGURE 4 is a fragmentary sectional view of a modified form of connection between the torque transmitting element and a planetary gear in an apparatus embodying the invention.

The spherical bearing 70 may in some embodiments be replaced by a diaphragm-type connection between the end of the torque arm 66 and the center of the journal 52. Such a diaphragm is represented in FIGURE 4 at 82 and may be flat, corrugated, conical or some other shape and may be a source of additional spring action. In the embodiment shown the diaphragm 82 is clamped to the torque arm 66′ by a nut 84 with washer. The journal 52′ is split radially to present two similar parts between which the periphery of the flexible diaphragm 82 is held by nutted bolts 86. Because the diaphragm precludes turning and lateral shifting of the journal in the carrier, there is no need for the keyed end cap as at 54 in the FIGURE 1 embodiment.

It should, therefore, be understood that variations are possible within the scope of the invention. Therefore, having particularly described my invention, it is to be understood that this is by way of illustration, and that changes, omissions, additions, substitutions and/or other modifications may be without departing from the spirit thereof. Accordingly, it is intended that the patent shall cover, by suitable expression in the claims, the various features of patentable novelty which reside in the invention.

I claim:

1. For operation at high speeds of rotation, a planetary gear system comprising a sun gear, an internal gear surrounding said sun gear, a plurality of planet gears each meshing with the sun gear and the internal gear, restraining means holding the planet gears from movement outward under centrifugal force and permitting them individual limited annular movement with respect to said restraining means, torque transmitting means independent of said restraining means and having arms connecting said planet gears respectively and being adapted to transmit annular movement of the planet gears, the torque transmitting means being particularly adapted to flex to permit under resilience the annular shift of one of the planet gears with respect to the others to improve distribution of tooth load.

2. A planetary gear system as described in claim 1 wherein the arms are pivotally connected to the planet gears.

3. A planetary gear system as described in claim 1 wherein the planet gears are each mounted in arcuate slots in the restraining means.

4. A planetary gear system as described in claim 1 wherein each planet comprises a central journal held against movement with respect to the restraining means and a gear rim rotatably disposed about the journal.

5. A planetary gear system comprising a sun gear, a ring gear circumposing said sun gear, at least one orbital gear intermeshing with both the sun and ring gears, mounting means mounting said orbital gear for revolution about the sun gear and restraining said orbital gear against the outward urging of centrifugal force but permitting annular adjustment of the orbital gear with respect to the mounting means, torque means independent of said mounting means and comprising a shaft mounted substantially on the axis of the system, a radial torque element secured to said shaft, an arm secured to said torque element and substantially parallel to the axis of the system, and means connecting the distal end of the arm to the orbital gear adjacent its center.

6. A planetary gear system comprising a sun gear, a ring gear surrounding said sun gear, a plurality or orbital gears each intermeshing with the sun gear and the ring gear, an orbital-gear-carrying cage adapted to rotate about the axis of the system, said orbital gear being mounted for rotation in said cage for limited annular movement with respect to said cage, said orbital gears each having an opening, torque means independent of said cage and comprising a shaft mounted substantially on the axis of the system and a radial torque element fixedly secured to said shaft, a plurality of arms connected to said element and each substantially parallel to the axis of the system, the distal end of said arms extending into the openings in said orbital gears respectively and being swivelly attached to the gears respectively.

7. A planetary gear system comprising a sun gear, a ring gear surrounding said sun gear, a plurality of orbital gears each having laterally extending stub shafts and each intermeshing with both the sun gear and the ring gear, each of said orbital gears having axial openings into said shafts, an orbital-gear-carrying cage adapted to rotate about the axis of the system and comprising a pair of parallel plates having aligned opening receiving the stub shafts in loose fit respectively to permit annular adjustment of the orbital gears, torque means independent of said cage and comprising a shaft mounted substantially on the axis of the system and a radial torque element fixedly secured to said shaft, a plurality of arms connected to said element and substantially parallel to the axis, the distal ends of said arms extending into the openings in said orbital gears respectively and therein being swivelly attached to the orbital gears respectively.

8. A planetary gear system as described in claim 7 wherein the opening in said plates are arcuate, concentric with the system.

References Cited by the Examiner

UNITED STATES PATENTS

| | | | |
|---|---|---|---|
| 1,586,309 | 5/1926 | Hult | 74—801 |
| 2,591,734 | 4/1952 | Smith et al. | 74—411 X |
| 2,971,407 | 2/1961 | Katz | 74—801 |
| 3,080,775 | 3/1963 | Fritsch | 74—801 |

DAVID J. WILLIAMOWSKY, *Primary Examiner.*

L. H. GERIN, *Assistant Examiner.*